United States Patent [19]

Smith

[11] Patent Number: 5,690,454

[45] Date of Patent: Nov. 25, 1997

[54] ANCHORING RETAINER FOR THREADED FASTENERS

[75] Inventor: Jon D. Smith, Gladwin, Mich.

[73] Assignee: Dry Dock Industries, Inc., Fenton, Mich.

[21] Appl. No.: 475,556

[22] Filed: Jun. 7, 1995

Related U.S. Application Data

[63] Continuation-in-part of Ser. No. 357,078, May 17, 1995, which is a continuation of Ser. No. 153,152, Nov. 15, 1993, abandoned, which is a continuation-in-part of Ser. No. 980,555, Nov. 23, 1992, abandoned.

[51] Int. Cl.$^6$ .............................. F16B 13/04; F16B 21/00
[52] U.S. Cl. .................... 411/30; 411/38; 411/344; 411/908
[58] Field of Search .................... 411/34–38, 340, 411/344, 345, 346, 908, 30, 31

[56] References Cited

U.S. PATENT DOCUMENTS

| | | |
|---|---|---|
| 2,018,251 | 10/1935 | Croessant . |
| 2,148,977 | 2/1939 | Buck . |
| 3,316,796 | 5/1967 | Young ........................... 411/29 |
| 3,385,156 | 5/1968 | Polos . |
| 3,453,927 | 7/1969 | Moore . |
| 4,642,009 | 2/1987 | Fischer ........................... 411/38 |
| 4,875,815 | 10/1989 | Phillips, II ..................... 411/38 |
| 4,920,618 | 5/1990 | Iguchi ............................ 24/453 |
| 5,205,688 | 4/1993 | Sundstrom ...................... 411/38 |
| 5,380,135 | 1/1995 | Anquetin ........................ 411/38 |

FOREIGN PATENT DOCUMENTS

| | | |
|---|---|---|
| 130506 | 2/1928 | Germany . |
| 3117649A1 | 2/1982 | Germany . |
| WO9008265 | 7/1990 | WIPO . |

Primary Examiner—Neill R. Wilson
Attorney, Agent, or Firm—Howard & Howard

[57] ABSTRACT

A retainer has inner and outer subsections that are hingedly connected. An outer portion is hingedly connected to the outer subsections. The outer subsection rotates on its hinge relative to the outer portion, and axially back towards the inner surface of the wall to contact the wall. The inner subsection extends to a connection with the inner head portion. The inner and outer subsections are in abutting contact adjacent to the hinge. The abutting contact creates a holding force at the point of contact between the hinge and the inner wall. This results in a truss-like configuration that securely retains the retainer in the wall.

25 Claims, 9 Drawing Sheets

ANCHORING RETAINER FOR THREADED FASTENERS

This application is a continuation-in-part of U.S. patent application Ser. No. 08/357,078, filed May 17, 1995, which is a continuation of Ser. No. 08/153,152, filed Nov. 15, 1993 now abandoned, which is a continuation-in-part of Ser. No. 07/980,555 filed on Nov. 23, 1992 now abandoned.

FIELD OF THE INVENTION

This invention relates to anchoring retainers used to secure threaded fasteners in a wall. More specifically, this invention relates to deflecting plastic retainers for use in a hollow wall or in a blind hole.

BACKGROUND OF THE INVENTION

Anchoring retainers of various types are commonly used to secure threaded fasteners in hollow walls and in blind holes. One of the most common anchoring retainers used with hollow walls is the metal wing toggle. Metal wing toggles have the advantage of being very strong but have the disadvantage of tending to rotate with the threaded fastener unless the threaded fastener is pulled on simultaneous while being turned to. Pulling the threaded fastener engages the wing toggle with an inner surface of the wall and prevents its rotation. It is readily apparent that this is a very awkward operation.

An improved anchoring retainer is shown in U.S. Pat. No. 5,244,324 which is assigned to the assignee of the present invention. The subject anchoring retainer illustrates one method of preventing rotation of the retainer during installation of a threaded fastener. In that example, arms of the retainer are pulled tight against an inside of the wall to prevent rotation of the retainer. A threaded fastener, or screw, can then be threaded into the retainer. This wing design, however, occupies a large volume of space in its free state, making it somewhat cumbersome to handle and requiring a larger volume of space to store. It is desired to provide an anchoring retainer having a relatively simple form and requiring a minimum of raw material to fabricate while providing superior anchoring capabilities.

In another type of known plastic retainer, legs extend from an outer portion of the retainer and typically are bent around the aperture in the wall that holds the retainer. Those legs tend to contact the wall adjacent to the aperture. When the retaining force is transmitted through those legs, damage sometimes occurs to the wall around the aperture because of this contact. Moreover, the contact at that area does not provide as solid of a holding force as would be desirable.

SUMMARY OF THE INVENTION

The present invention provides an anchoring retainer with a generally cylindrical unitary body in its undeformed state with the body having an inner head portion positioned at one axial end of the body having thread engaging means disposed therein, an outer portion positioned at another axial end of the body having retention means for limiting axial travel of the retainer into an aperture and a middle portion disposed between the inner and outer portions having a plurality of legs separated by longitudinally extending circumferentially spaced slots and with hinges connecting the legs to the inner head portion and to the outer portion and also having a mid-section hinge in each of the discrete sections dividing the discrete sections into inner and outer subsections.

The inner and outer subsections have their lengths configured so that as a threaded fastener passing through the outer and middle portions and engaging the inner head portion is turned, the discrete sections hinge or buckle outwardly at the mid-section hinges. The buckling or hinging movement continues until the outer subsections contact or abut an inner surface of the wall. At this point, the anchoring retainer has a generally truss-shaped configuration inside the wall. Tightening of the fastener continues, drawing the inner head portion ever closer to the wall, and moving the inner subsection into contact with the outer subsection. In addition, the inventive truss-like configuration ensures that the legs extend from the outer portion at a position axially inwardly of the aperture. The outer subsection or leg extends from the outer portion axially back towards the wall to contact the wall at a contact point that is thus spaced away from the aperture. The several subsections contact the wall at locations spaced about the axis of the aperture. This develops a significant amount of compressive load against the wall. This compressive load greatly contributes to the anchor retainer effecting a very strong attachment to the wall providing a highly stable engagement means for the threaded fastener with the wall. Additionally, the retainer benefits from the relatively low vibration transmissibility characteristics of the plastic of which the retainer is formed to aid in damping vibrations transmitted both through the fastener to the wall and vice versa. This anchor has both high strength and high isolation capabilities.

In other embodiments of this invention, anti-rotation features are disclosed on the subsections, the outer portion and the head. The anti-rotation features ensure that the various components of the retainer do not rotate relative to each other as the threaded fastener is tightened within the retainer.

The main features of this invention could be summarized as providing a retainer having inner and outer subsections that are hingedly connected. The outer subsection is hingedly connected to an outer portion of the retainer. The outer portion of the retainer is sized such that it will extend entirely through the wall which is to utilize the retainer. The outer subsection rotates on its hinge relative to the outer portion, and axially back towards the inner surface of the wall. An area adjacent the hinge between the inner and outer subsections contacts the wall. The inner subsection extends from this hinge to a connection with the inner head portion. The inner and outer subsections are in abutting contact adjacent to the hinge. The abutting contact creates a holding force at the point of contact adjacent the hinge and on the inner wall. This results in a truss-like configuration that securely retains the retainer in the wall. Moreover, since the points of contact are spaced away from the aperture, there is little chance of damage to the surface of the wall around the aperture. The holding forces are centered and spaced about the axis of the aperture, thus providing a more secure holding force. Finally, the abutting contact between the legs allows the retainer to withstand vibration, and provides a retainer that is resilient enough to take a shock or vibration without damage to the retainer or the wall surface.

These and other features of the present invention can be best understood from the following specification and drawings, the following of which is a brief description.

BRIEF DESCRIPTION OF THE DRAWINGS

FIG. 4 is a view in the direction of arrows 4 of FIG. 2 as it would appear if that section were rolled flat.

FIG. 40 is a side elevational view of two halves of a mold with an associated mold pin.

DETAILED DESCRIPTION OF A PREFERRED EMBODIMENT

The main features of this invention could be summarized as a retainer providing a truss-like holding configuration. Inner and outer subsections or legs are hingedly connected. The outer subsection is hingedly connected to an outer portion of the retainer. The portion extends entirely through the wall which is to utilize the retainer. The outer subsection rotates on its hinge relative to the outer portion, and axially back towards the inner surface of the wall. An area adjacent the hinge between the inner and outer subsections contacts the wall. The inner subsection extends from this hinge to a connection with the inner head portion. The inner and outer subsections are in abutting contact adjacent to the hinge, creating a holding force at the point of contact between the hinge and the inner wall. This truss-like configuration securely retains the retainer in the wall. The points of contact are spaced away from the aperture, eliminating crumbling or other damage to the surface of the wall around the aperture. Moreover, the holding forces are centered and spaced about the axis of the aperture, thus providing a more secure holding force. The abutting contact between the legs provides a resilient force to withstand shock or vibration.

Figures 1, 2, 5A, 5B, 6, 7, 8:
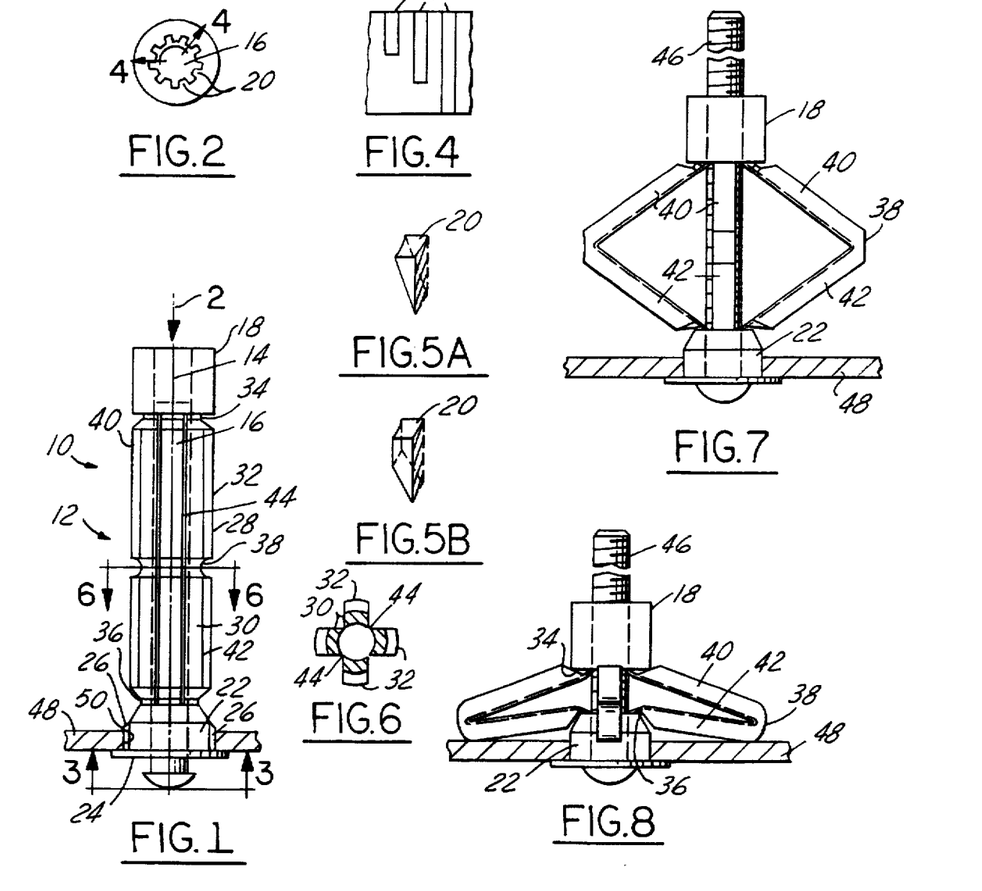
FIG. 1 is an elevational view of an anchoring retainer inserted in a wall with a threaded fastener disposed therein.
FIG. 2 is a view in the direction of arrows 2 of FIG. 1.
FIG. 5a is a perspective view of a configuration of splines used for thread engagement.
FIG. 5b is a perspective view of an alternative configuration of splines used for thread engagement.
FIG. 6 is a view in the direction of arrows 6 of FIG. 1.
FIG. 7 is an elevational view of an anchoring retainer after the legs have started buckling or hinging.
FIG. 8 is a side elevational view in which the legs have begun to collapse toward forming a trussing structure.
Figure 3:
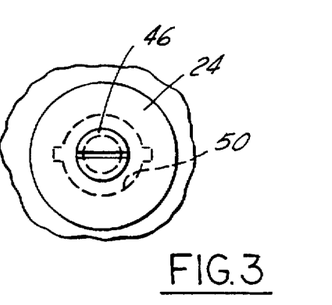
FIG. 3 is a view in the direction of arrows 3 of FIG. 1.

FIG. 1 shows an anchoring retainer 10 having a generally cylindrical unitary body 12 with a longitudinal axis 14 and an axial cavity 16 extending therealong. The unitary body 12 has a pair of axial ends. An inner head portion 18 of the unitary body 12 is positioned at one axial end and has a plurality of tapered flutes or splines 20 serving as thread engaging means within the axial cavity 16. An outer portion 22 is positioned at the other axial end and has a flange 24 disposed thereon distal to the rest of the anchoring retainer 10. The outer portion 22 also has anti-rotation tabs 26 extending radially therefrom. A middle portion 28 is disposed between the inner head portion 18 and the outer portion 22. The axial cavity 16 passes through the length of the body 10. The middle portion 28 has a plurality of like shaped circumferentially equidistant longitudinal slots 30 which run the length of the middle portion 28 and define four identical legs or discrete sections 32.

The legs are distributed about the axis such that all side views centered on any one of the legs 32 would look the same. The longitudinal slots 30 are defined on the radially outer portion of the unitary body 12. The middle portion 28 also has hinges 34 connecting the legs to the inner head portion an hinges 36 connecting the legs to the outer portion. The legs also each have a mid-section hinge 38 dividing each leg 32 into an inner subsection 40 and an outer sub section 42. The inner subsection 40 is proximate to the inner head portion 18 and is longer than the outer subsection 42 which is most proximate to the outer portion 22. The hinges 34, 36, 38 are generally perpendicular to the longitudinal axis 14 and are defined by a localized reduction in the cross-sectional area of the legs 32 on the external periphery.

The cross-section shown in FIG. 6 illustrates the reduction in cross-sectional area at the hinges. FIGS. 2, 4 and 5 illustrate the structure of the tapered spline 20. As is shown in FIG. 2, there are nine splines paralleling the longitudinal axis and evenly distributed around the circumference of the axial cavity 16.

FIG. 4 shows a flat projection of three juxtapositioned splines 20 illustrating their different lengths. The splines taper from the circumference of the axial cavity 16 to a common predetermined height.

FIGS. 5a and 5b illustrate two potential configurations for splines 20. In the configuration shown in FIG. 5a, the splines 20 reach their common height only at an end of the spline. In the configuration shown in FIG. 5b, the splines reach a common height at a point below the end of the spline. The second alternative spline configuration is readily seen as providing greater cumulative thread engagement than the first but would likely require greater installation effort to install a fastener. The cross-section shown in FIG. 6 also illustrates a connecting web 44 disposed between the legs at the axial cavity 16.

The invention as shown in the embodiment of FIG. 1 operates in the following manner. A threaded fastener or screw 46 is passed through an opening in the flange 24 and into the axial cavity 16. In this particular embodiment, the anchoring retainer 10 is inserted into a wall or panel 48 which has a preformed aperture complimentary in shape to the outer portion 22'. The anti-rotation tabs 26 engage complimentary slots of the wall aperture. As the threaded fastener or screw 46 is turned, the anti-rotation tabs 26 prevent the anchoring retainer 10 from rotating in the wall 48. Threads on the screw engage the longest of the tapered splines 20. The threaded fastener 46 is turned, causing the threads to engage the longest of the tapered splines 20. Continued turning of the screw brings it into threading engagement with all nine splines disposed within the axial cavity and draws a head of the screw 46 up against the flange 24 of the anchoring retainer. Continued turning of the screw 46 produces an axially compressive force in the legs 2. Further tightening of the screw causes the connecting webs 44 to split or rupture and the legs 32 to buckle radially outward, bending at their hinge points 34, 36, 38. Other embodiments not having the webs 44 would similarly buckle without rupturing any web.

The splines being at various locations ensure that as a thread begins to engage the splines, it will not engage all of the splines at one time. Rather, it will initially begin engaging a portion of the splines, as the screw enters into the retainer it continues to serially engage others of the splines. This reduces the insertion resistance, and further minimizes the likelihood that the retainer will begin to turn relative to the aperture as the screw is tightened into the retainer.

Figure 9:
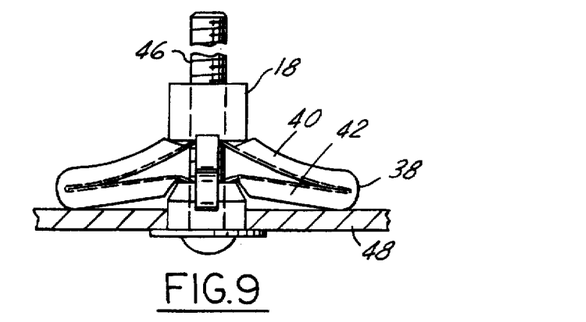
FIG. 9 is a side elevational view of an anchoring retainer in which the legs have been further collapsed toward a final truss position.
Figures 25A, 25B, 28:
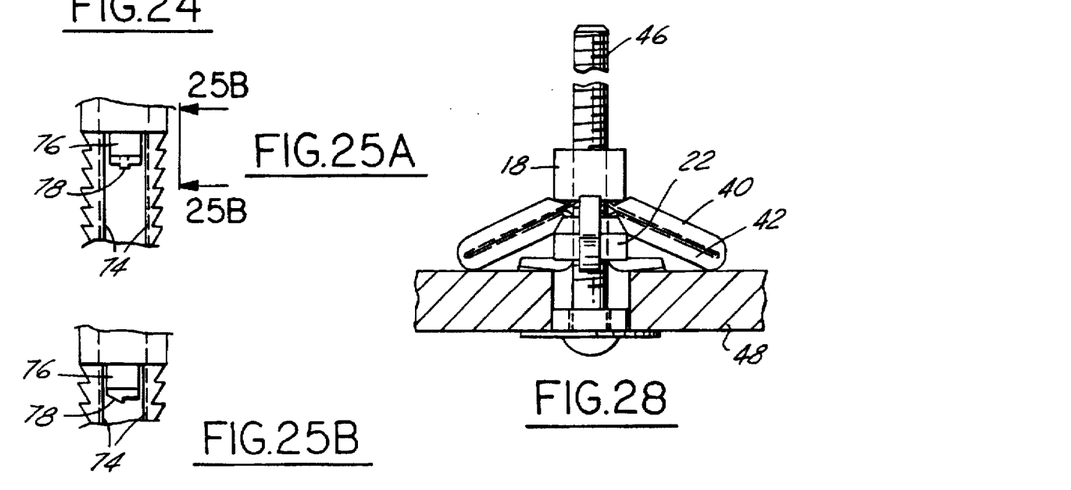
FIG. 25A is a view in the direction of arrow 25 of FIG. 24 showing a first embodiment of a flapper.
FIG. 25B is a view in the direction of arrow 25 of FIG. 24 of a second embodiment of the flapper.
FIG. 28 is a side elevational view of the embodiment of FIG. 24 after the legs have been collapsed to a final abutting truss configuration.
Figure 27:
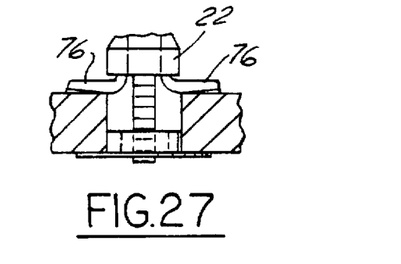
FIG. 27 is a broken out portion of a side elevational view of the embodiment shown in FIG. 24 after a retaining cap has been snugged against the wall.

An anchoring retainer with buckled legs is shown in FIG. 7. Continued turning of the screw 46 draws the inner portion 18 yet closer to the outer portion 22 and the wall 48, to a point where the outer subsections 42 contact an inner surface of the wall 48 to form the truss like shape shown in FIG. 8. Yet further tightening of the screw 46 causes the inner subsections and the outer subsections 42 to deflect to nearly a flat position as shown in FIG. 9. The outer subsections 42 abut the inner surface of the wall, the outer subsections 42 and the inner subsections 40 foldingly abutting each other, and the inner subsections 40 foldingly abutting the inner head portion proximate to the hinges 34 therebetween. It is this collapsing from the truss shape to the final nearly flat shape which produces the particularly high clamp loads characteristic of this retainer. The final collapsed truss configuration is best shown in FIG. 28.

The FIG. 9 embodiment shows that the contact point is spaced far outwardly from the aperture through the wall 48. Thus, the holding force for the retainer relative to wall 48 is at several spots circumferentially spaced and spaced at a radial distance from the aperture. There is little chance of damage to the area closest to the aperture from this holding force, and further the spaced holding forces ensure a solid connection of the retainer in the wall.

Preferably, the inner subsections 40 is longer than the outer subsections 42 in order for the outer subsections to contact the inner surface of the wall 48 before the legs 32 have been essentially flattened.

Many alternative embodiments are anticipated for specialized uses of this retainer design.

Figure 10:
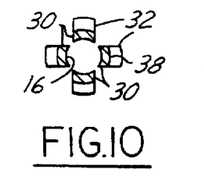
FIG. 10 is a view in the direction of arrows 6 in FIG. 1 of a first alternative embodiment.
Figure 11:
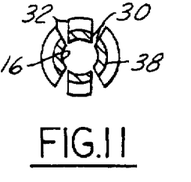
FIG. 11 is a view in the direction of arrows 6 of FIG. 1 of a second alternative embodiment.

FIG. 10 shows a cross-section of a middle portion 28 similar to that shown in FIG. 6 except lacking the connecting webs 44. FIG. 11 shows an alternative embodiment also lacking connecting webs but with two opposed legs having appreciably greater cross-sectional areas than the other two legs 32. This provides an anchoring retainer 10 with an ability to sustain greater loads than anchoring retainers 10 with smaller identical legs 32.

Figure 12:
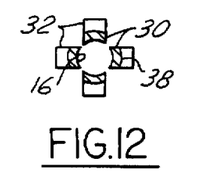
FIG. 12 is a view in the direction of FIG. 1 of a third alternative embodiment of the retainer for square apertures.
Figure 13:
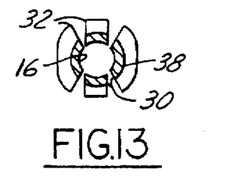
FIG. 13 is a view in the direction of arrows 6 of FIG. 1 of a fourth alternative embodiment of the retainer for square apertures.

FIGS. 12 and 13 illustrate anchoring retainers 10 designed for use with the square apertures. Square apertures have the advantage of not requiring additional anti-rotation means such as tabs 26 at the outer portion 22. FIG. 12 shows the cross-section of an anchoring retainer 10 having four identical legs 32 for use in a square aperture. FIG. 13 shows the cross-section of an anchoring retainer 10 having two larger cross-sectional legs 32. The larger legs here also offer a potential increase in strength of the anchoring retainer.

It should be noted that a wide variety of other configurations not shown here is possible as well. One possibility is a D-shaped anchoring retainer 10 having a single flat side to prevent rotation in a similarly shaped aperture.

Figure 14:
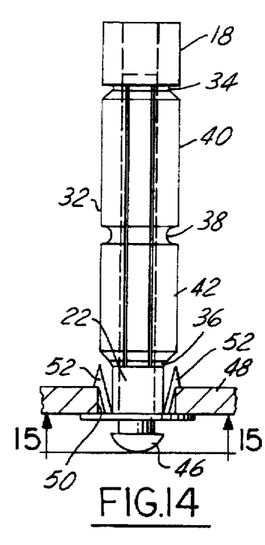
FIG. 14 is a side elevational view of yet another embodiment of the anchoring retainer.

FIG. 14 illustrates a configuration which prevents an anchoring retainer 10 from falling back out of an aperture into which it has been inserted before the screw 46 has been tightened to collapse the legs 32. A pair of barbed tines 52 extend from the outer portion 22 at an angle to the longitudinal axis 14. In a free state, the tines project radially outward beyond the aperture in the wall 48 into which the anchoring retainer 10 is to be inserted. When the anchoring retainer 10 is inserted into the wall 48, the tines 52 fold inwardly against the outer portion as the outer portion enters the wall aperture 50. When the anchoring retainer 10 is fully inserted with the flange 24 pressed against an outside of the wall, the barbed tines 52 will have snapped radially outward to provide engagement with the wall 48. This effectively traps the retainer 10 in the wall with axial motion being limited by the flange 24 and the barbed tines 52. It is anticipated that this configuration would be most effective when used with walls made of relatively stiff material such as steel, plastic composites, or laminates.

Figures 16, 17, 18:
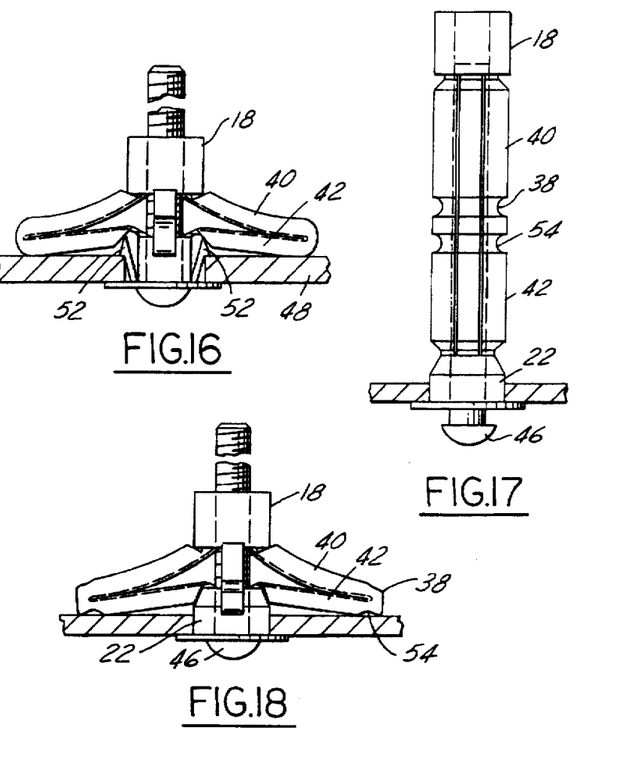
FIG. 16 is a side elevational view of the anchoring retainer of FIG. 14 in a collapsed position.
FIG. 17 is a side elevational view of yet another embodiment of the invention showing 4 hinges in each leg.
FIG. 18 is a side elevational view of the embodiment shown in FIG. 17 in a collapsed position.

As shown in FIG. 16, there can be contact between the collapsed legs 32 and the barbed tines 52. This is largely inconsequential, however, as the retaining function provided by the barbed tines 52 is no longer necessary when the legs 32 have been completely collapsed.

Figure 15:
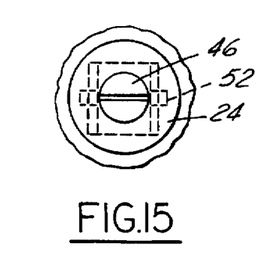
FIG. 15 is an end view in the direction of arrows 15 of FIG. 14.

FIG. 15 shows the anchoring retainer 10 in this embodiment to have a cross-section suited for use with a square aperture. This prevents rotation of the anchoring retainer 10 as the screw is being threaded therein.

FIGS. 17 and 18 show an alternative embodiment of the invention having second mid-section hinges 54 in close proximity to the other mid-section hinges 38 in each of the legs. A distance between the hinge 34 at the inner head portion 18 and the most proximate mid-section hinge 38 is greater than a distance from the same mid-section hinge 38 to the hinge 36 connecting the leg 32 with the outer portion 22. This requirement allows that portion of the legs between the mid-section hinges 38 and 54 to contact the inner surface of the wall 48 after the legs 32 have been collapsed.

Figures 19, 20, 22, 23:
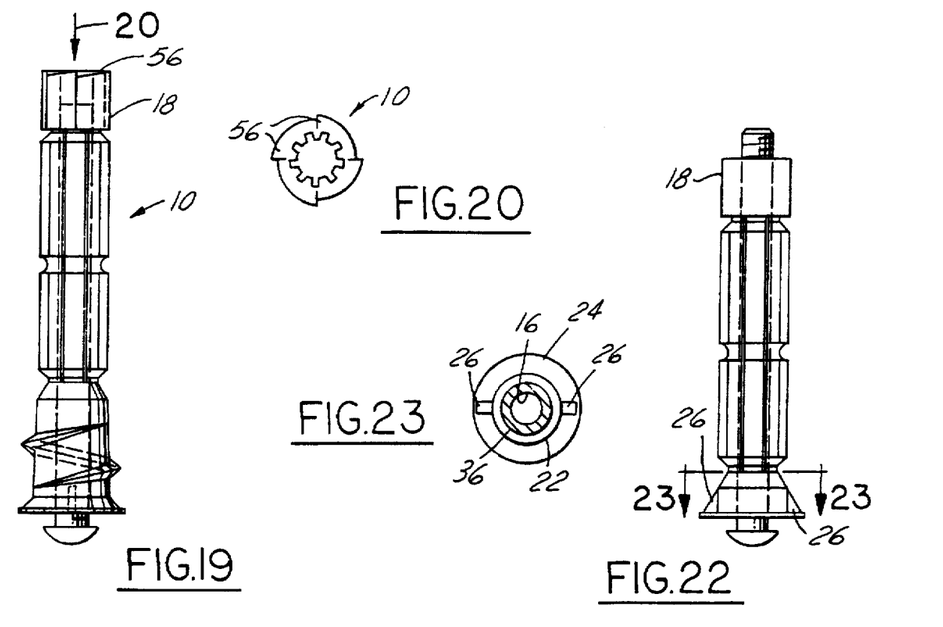
FIG. 19 is a side elevational view of yet another embodiment of the anchoring retainer.
FIG. 20 is a view in the direction of arrows 20 of FIG. 19.
FIG. 22 is a side elevational view of yet another embodiment of the anchoring retainer.
FIG. 23 is a sectional view of in the direction of arrows 23 of FIG. 22.
Figure 21:
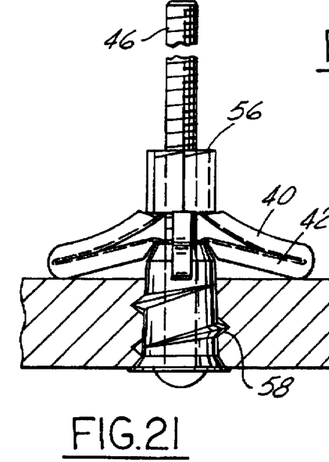
FIG. 21 is a side elevational view of the anchoring retainer of FIG. 19 in a collapsed position.

FIG. 19 shows an anchoring retainer 10 with an inner head portion 18 having an integrally formed four flute boring tip 56. The anchoring retainer 10 of FIG. 19 also has a rotative lock means provided by a thread form 58 on the outer portion 22. The thread form 58 restricts rotation of the anchoring retainer 10 in the clockwise direction, allowing the screw 46 to be threaded into the tapered flutes 20 to draw down the inner portion 18 as shown in FIG. 21.

Figures 31, 32:
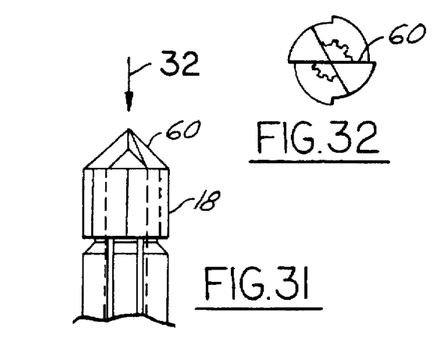
FIG. 31 is a side elevational view of an inner portion showing yet another alternative embodiment.
FIG. 32 is a view in the direction of arrows 32 in FIG. 31.
Figure 35:
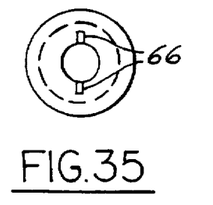
FIG. 35 is an axial end view toward the outside portion of FIG. 34.
Figure 36:
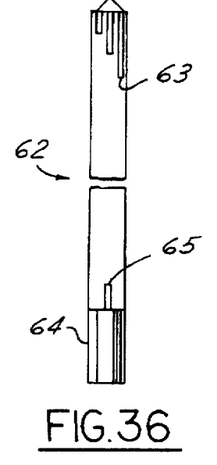
FIG. 36 is a side elevational view of an elongated driving tool.

FIGS. 31 and 32 show a related inner head portion configuration having a four flute design, but capped by a two fluted drill tip 60. In such an embodiment, the screw 46 would separate the drill tip flutes to exit the inner head portion 18. A driving tool 62 is shown in FIG. 36. The driving tool 62 has flutes or splines 63 at one end complimentary in shape to the splines 20 in the inner head portion 18. On a second end, the driving tool 62 has a slot 65 for engagement by a driving bit 64 driven by a drill motor or the like. Several slots could be utilized. The driving bit 64 has a blade sufficiently wide to engage both the slot 65 of the driving tool 62 and a drive area 66 of the outer portion 22 shown in FIGS. 19, 34 and 35. Simultaneous engagement of both the inner portion and the outer portion by the driving tool and driving bit respectively prevents the anchoring retainer 10 from being twisted apart at one of the hinges when the inner head portion sustains the torsional loads associated with boring into a wall and the outer head portion sustains the torsional loads associated with threadably engaging the wall with the thread form 58. It is anticipated that anchoring retainers 10 having integrally formed boring tips 56, drill tips 60 and thread forms 58 as described would be employed with relatively soft wall material such as construction drywall.

FIGS. 22 and 23 show anti-rotation tabs 26 appropriate for use with construction drywall which require the provision of no complimentary slots, as the tabs will displace the drywall material.

Figures 24, 26:
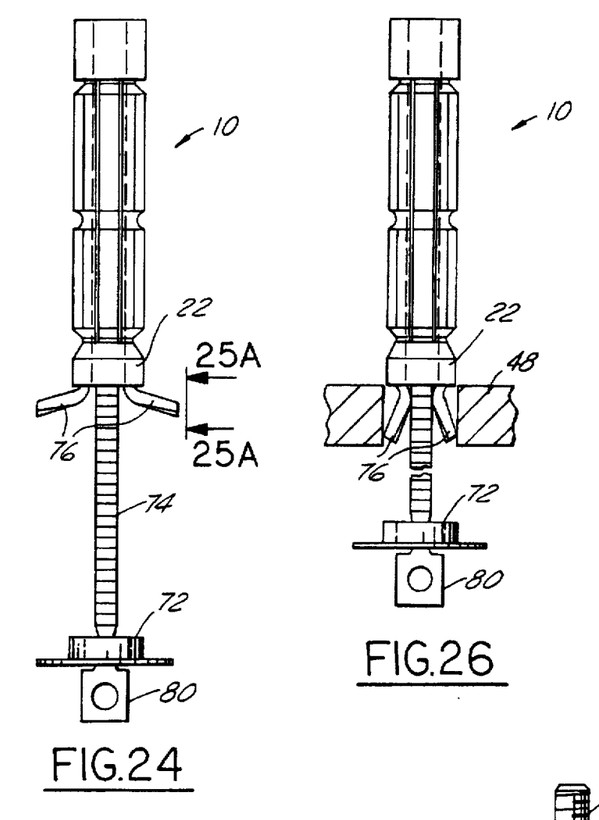
FIG. 24 is a side elevational view of yet another embodiment of the anchoring retainer.
FIG. 26 is a side elevational view of the embodiment of FIG. 24 as it passes through a wall.

FIGS. 24, 25A, 25B, 26, 27 and 28 all show a cap 72 and strip 74 configuration like that described in U.S. Pat. No. 5,244,324 issued on Sep. 14, 1993, assigned to the assignee of the present invention, and hereby incorporated by reference. This embodiment of the of the invention has a pair of flip fins extending radially from the outer portion. The flip fins 76 deflect radially inward as shown in FIG. 26 when the anchoring retainer 10 is passed through the wall 48. Once the retainer 10 has completely passed through the wall aperture 50, the flip fins 76 resume their radially extended position. The flip fins 76 have engaging teeth 78 as shown in two alternative forms in FIG. 25A and 25B. The engaging teeth 78 are pressed into contact with the inner surface of the wall when the strips are tensionally loaded by an installer pulling on an end block 80. The cap 72 is then pressed upward into the wall aperture 50. Engaging means between the cap 72 and the strips 74 resist any displacement of the cap away from the retainer 10. The screw is then installed in the retainer, drawing the inner portion toward the wall and the outer portion to a relatively flat position as shown in FIG. 28.

Figure 29:
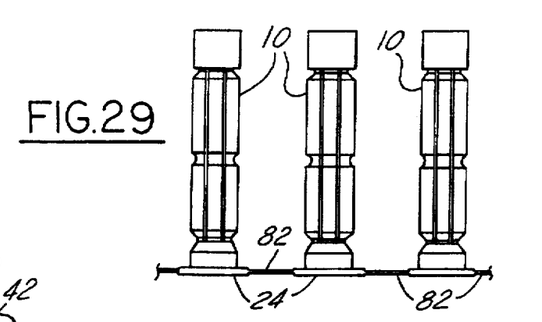
FIG. 29 is a side elevational view of yet another embodiment of the present invention.
Figure 30:
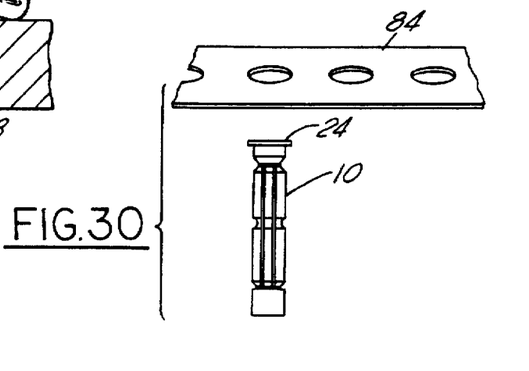
FIG. 30 is a plan view of a carrier belt for use with the present invention.

FIG. 29 shows a plurality of anchoring retainers 10 connected at their outer portions 22 by a simultaneously molded connecting strip 82. The connecting strip 82 has a thinner section than the flanges 24 of the retainers 10. The flange 24 to strip 82 interface is configured to facilitate separation of the retainers 10 from the strip 82. Molding anchoring retainers 10 connected in this fashion lends itself to dispensing the retainers in a semi-automatic or automatic feed installation device similar to air powered installation devices used to install conventional nails. An alternative variation of this concept is illustrated in FIG. 30 which shows a belt into which anchoring retainers can be temporarily installed. Anchoring retainers 10 would be snapped into and out of the belt 84 with the flange 24 engaging openings in the belt 84.

Figure 33:
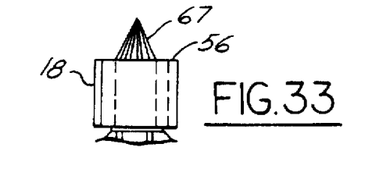
FIG. 33 is a side elevational view of an inner portion with a drill tip extending beyond the inner portion.

FIG. 33 shows a drill tip forming 67 molded integral with and extending from the inner head portion with cutting flutes formed by extensions of the splines 20 of the inner head portion 18. Such a forming 67 can be used to initiate the drilling of a hole.

Figure 38:
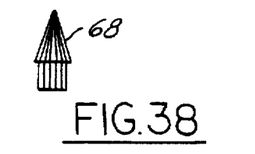
FIG. 38 is a side elevational view of a drill tip insert.

FIG. 38 shows a drill tip insert 68 which can be used to initiate the forming of a hole. The drill tip insert 68 is formed of a relatively hard material and has splines on shank portion which engage the splines within the inner head portion. Cutting flutes are disposed on a tip portion of the insert. The flutes can be extensions of the splines of the shank portion of the drill tip insert. When installed for use in a retainer, it would appear much like FIG. 33.

Figure 37:
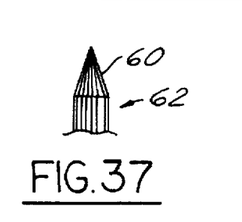
FIG. 37 is a side elevational view of an alternative tip for the driving tool of FIG. 36.

Additionally, the driving tool 62 can be formed with a tip shaped identical to the drill tip insert 68 extending from the splines of the driving tool 62 as shown in FIG. 37.

Figure 39:
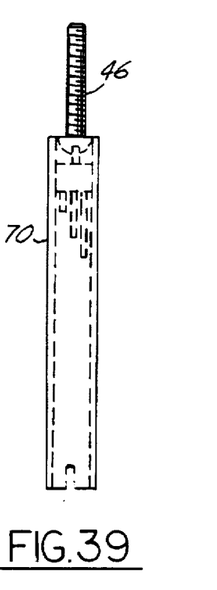
FIG. 39 is a side elevational view of an adapter sleeve.

FIG. 39 shows an adapter sleeve 70 which can be used to install the screw 46.

Figure 34:
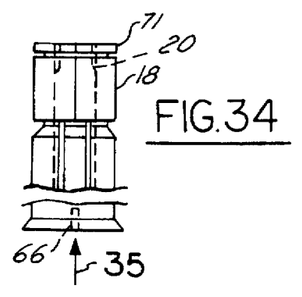
FIG. 34 is a side elevational view of a retainer embodiment with a cutter blade disposed on the inner portion.

FIG. 34 shows a retainer having a boring tip in the form of a cutter blade 71 disposed on an end of the inner head portion. The cutter blade 71 is formed of a hard plastic or of steel and has axially extending teeth, not shown. The cutter blade 71 has splines engaging the splines 20 of the inner head portion 18. The cutter blade is displaced from the inner head portion by the screw 46 when it is tightened. FIG. 35 shows an axial end view of the retainer of FIG. 34 looking toward the outer end.

While the discussion of the preferred embodiment of the invention describes the installation of subject anchoring retainers 10 into hollow walls 48, it is also readily apparent that such anchoring retainers 10 could be beneficially employed in blind holes as well. As the legs 32 begin expanding radially outward, they would engage the wall into which they were inserted, resisting removal of the retainer from the hole.

It is also to be appreciated that although the bulk of this discussion has been directed to embodiments having four legs, it is anticipated that configurations with more legs or fewer legs and an even or an odd number of legs are possible. Retainers having two legs, while providing less lateral stability, might be able to fit into spots too narrow to allow the flattening of four legs.

A further advantage of this invention over known retainers is that it easily lends itself to manufacture. The embodiments shown in the Figures can be easily fabricated using a two-piece A-B mold 86, 88 with a molding pin 90 disposed therebetween. The molding pin is of a predetermined diameter and has spline forms cut into the predetermined diameter. Two mold sections have opposing cavities with longitudinal ridges of a height which define a diameter equal to or alternatively slightly greater than the predetermined diameter of the pin. The ridges also define a longitudinal axis of the cavity formed by mating the mold sections. The ridges in the mold form the slots in the middle portion without any need for blades or the like. With the mold sections mated together, and the pin disposed therein, molten plastic is injected under pressure into the mold. The plastic is cooled, the pin withdrawn from the now solidified plastic, and the mold section 86, 88 separated normal to a split line. The finished retainer 10 is then removed from the mold.

Figure 41:
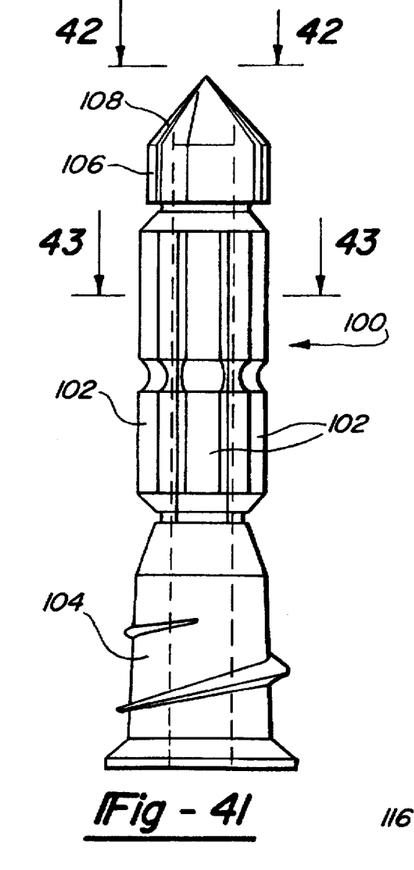
FIG. 41 shows another embodiment retainer.

FIG. 41 shows yet another embodiment retainer 100 which incorporates three sets of subsections or legs. The invention could also be used with two legs. As shown, the three sets 102 are formed of equal angular extent about the central axis of retainer 100. The outer portion 104 is connected to the subsections as in the previous embodiments, and the head 106 is formed with cutting splines 108, and is connected to all three of the subsections 102 as in the previous embodiment.

FIG. 41 shows an angled surface 103 on the outer subsection adjacent to the mid-section hinge. This angled surface 103 will be at the area of contact when the retainer is fully received in a wall and will provide a greater surface area for contact.

Figure 42:
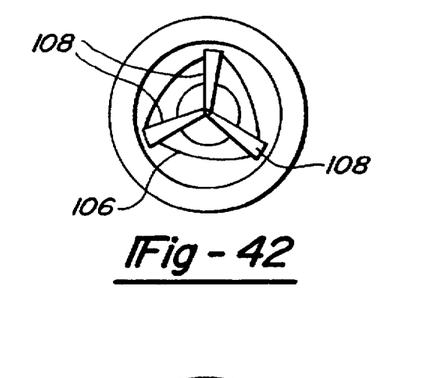
FIG. 42 is an end view along line 42—42 as shown in FIG. 41.
Figure 43:
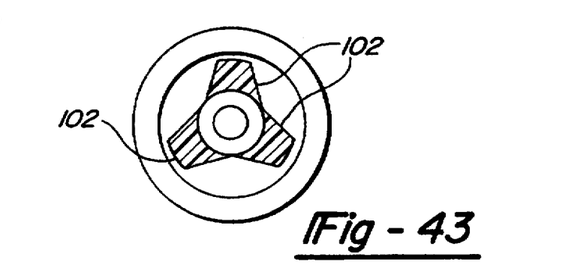
FIG. 43 is a cross-sectional view along line 43—43 as shown in FIG. 41.

As shown in FIG. 42, the sections each extend for approximately one-third of the circumference of the retainer 100. As shown in FIG. 43, the increased circumferential extent of the legs allows the legs to be sufficiently rigid such that they will resist twisting or rosetting when the screw is tightened in the retainer. In other embodiments utilizing more legs, each leg might be individually circumferentially too thin to resist rosetting or twisting. While twisting may sometimes be acceptable, there may be applications where it is undesirable. The increased thickness of the hinged areas with this three-subsection embodiment decreases the likelihood of twisting.

Figure 44A:
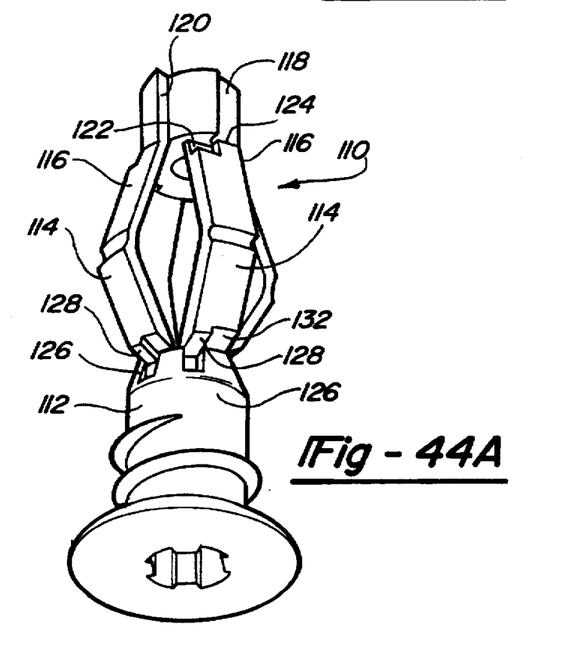
FIG. 44A shows another embodiment retainer.
Figure 44B:
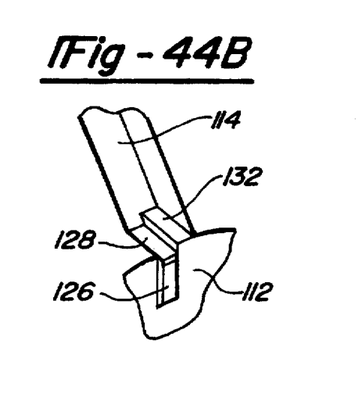
FIG. 44B shows a detail.
Figure 44C:
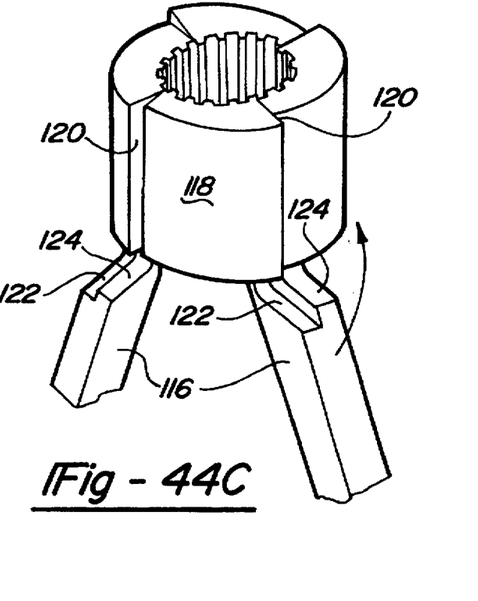
FIG. 44C shows a detail.

FIGS. 44A-44C show features incorporated into retainer 110. In retainer 110 the outer portion 112 is connected to an outer subsection 114 that is in turn connected to an inner subsection 116. Inner subsection 116 is connected to an inner head 118 that is formed with cutting splines 120. The retainer 110 includes a structure to resist relative rotation of the several components of the retainer 110 as the screw is tightened within the retainer. To this end, the inner subsections 116 are formed with a cut-out 122 adjacent to the hinge, and an adjacent section 124 that is relatively radially thicker compared to the cut-out 122. The head 118 could also be formed with cut-outs 119 to facilitate further bending.

Similarly, the portion of the outer portion 112 adjacent to the inner subsection 114 is formed with a cut-out 126 that receives a radially thicker portion 128 from the outer subsection 114. A thicker portion 130 on the outer portion 112 is received within cut-out 132 of the inner subsection 114.

Figure 45:
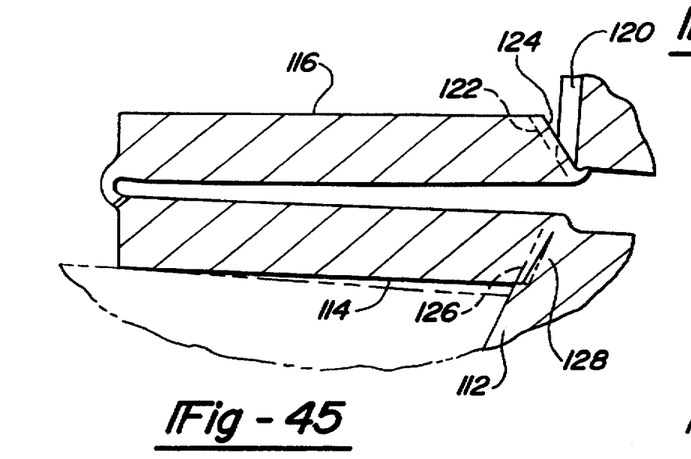
FIG. 45 is a cross-sectional view through a portion of the retainer shown in FIG. 44 in an assembled position.

When the retainer 110 is received within the wall 134 as shown in FIG. 45, the thicker portion 124 rotates upwardly to be in abutting contact with the cutting spline 120. The cut-out 122 allows the thicker portion 124 to move upwardly such that it will be at the same axial location as the cutting spline 120. Similarly, when the outer subsection 114 bends relative to the outer portion 112, cut-out 132 receives thicker portion 130 (not shown in this figure) and thicker portion 128 extends upwardly into cut-out 126. Once the thicker portions are received in the cut-outs, they will be in abutting contact resisting relative twisting between the components.

Note also the greater contact area provided by angled surface 103.

Figure 46:
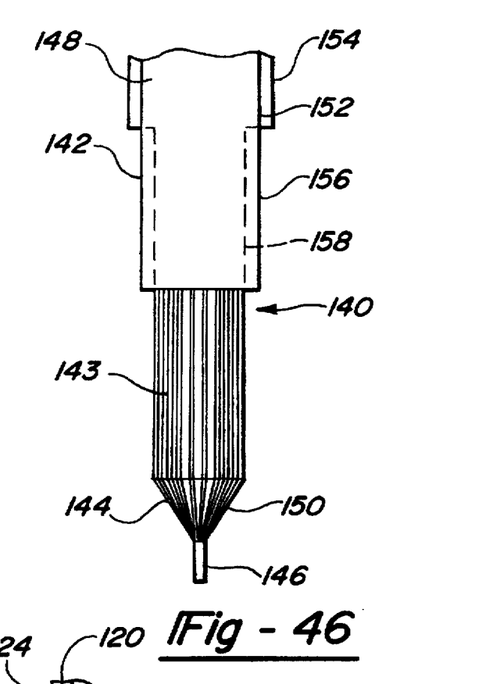
FIG. 46 shows a mold pin for forming a retainer according to this invention.

FIG. 46 shows a center pin embodiment 140 which might be incorporated into the mold as shown in FIG. 40. Pin 140 has a stepped outer circumference with a relatively thin portion 144 leading to a thinner portion 143 that extends to a tapered head 144. Tapered head 144 leads to a tapered pilot extension 146 which may be received within corresponding structure in the mold halves for centering the pin. An outer relatively thicker portion 148 is formed at the outer end of mid-section 142. A raised flute 150 is formed on the tapered portion 154 such that it extends upwardly into the mold halves and provide a split in the formed retainer. This split facilitates breaking apart of the most forward portions of the retainer along the split line when the screw is received within the retainer. As shown in FIG. 46, the outer portion 148 is formed with a nominal outer periphery 152 and the plurality of ribs 154 extending from the nominal outer periphery 154. Similarly, subsection 142 is formed with a nominal outer periphery 156 and a plurality of spaced grooves 158. When the retainer is molded within the mold, the pin 140 will form structure on the subsections as shown in FIG. 47.

Figure 47:
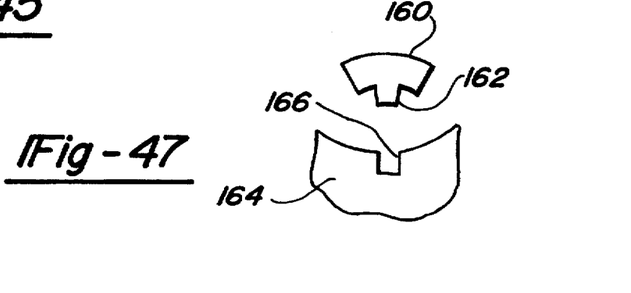
FIG. 47 shows a feature of two retainer legs incorporating one feature that can be provided by the pin of FIG. 46.

As shown in FIG. 47, the inner subsection 160 is formed with a tongue 162 from the groove 158. The outer subsection 164 is formed with a groove 166 from the rib 154. When the retainer is tightened to the position such as shown in FIG. 4, the tongue 162 is received within the groove 166 preventing relative rotation between the inner subsection 160 and the outer sub section 164.

Figures 48, 49, 50, 51, 52, 53, 54:
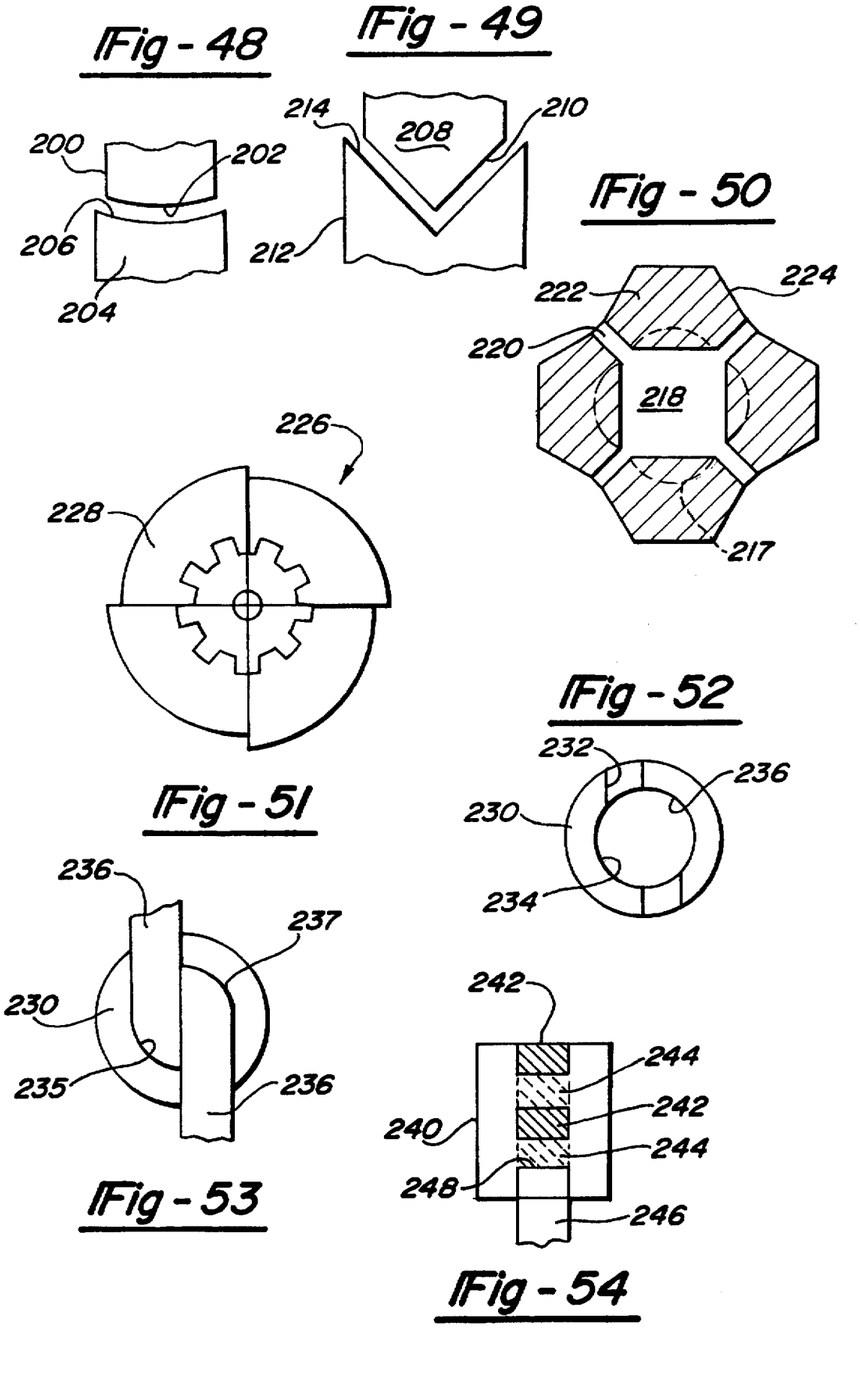
FIG. 48 shows an alternative to the features shown in FIG. 47.
FIG. 49 shows another alternative to the features shown in FIG. 47.
FIG. 50 shows an alternative pin for forming the inventive retainer.
FIG. 51 shows an alternative retainer structure.
FIG. 52 shows an alternative thread design in a retainer.
FIG. 53 shows a detail in the method of forming a thread as shown in FIG. 52.
FIG. 54 shows another alternative to form a thread according to the present invention.

FIG. 48 shows an alternative embodiment to achieve the features shown in FIG. 47. In the alternative, the inner subsection 200 is formed to have an outwardly bowed surface 202 facing inwardly until the retainer is collapsed. The outer subsection 204 has an inwardly bowed surface 206. The surfaces 202 and 206 can be formed by the pin in the same manner that the tongue and grooves were formed in a FIG. 47 embodiment. The surface 202 fits within the surface 206 and centers the legs upon each other as the retainer is tightened.

In FIG. 49, inner subsection 208 is formed with angled surface 210 in yet another embodiment. Outer subsections 212 are formed with correspondingly angled surfaces 214. Again, the surfaces 210 and 214 contact and serve to center the inner subsections 208 on the outer subsections 212.

It should also be understood that the embodiment shown in FIGS. 47–49 would also be easily modified to other geometric shapes. As an example, while a tongue and groove as shown in FIG. 47, the construction could also be angled or circular interfitting portions.

FIG. 50 shows another feature according to the present invention. Circumferentially interspaced between the structure 217 which is to form the tongue and grooves, etc., as in the FIGS. 47–49 embodiments, a pin 218 is formed with cutting fibs 220. When the retainer is formed about the pin 218, four distinct legs 224 are formed, separated by the cutting ribs 220. Thus, there may be sides 224 of the legs 222 that extend for a greater circumferential width than in the other embodiment, wherein the legs met at an inner-peripheral surface. This allows the legs to have a relatively greater circumferential extent and allows them to be much stronger than would otherwise be possible.

FIG. 51 shows yet another feature according to the present invention. In FIG. 51, a retainer head 226 is formed with four cutting splines 228. Again, while this invention specifically shows three and four-leg, and two, three or four cutting splines, a worker of ordinary skill in the art would recognize that other numbers could come within the scope of this invention.

FIG. 52 shows the head 230 of yet another embodiment retainer having a distinct thread. Head 230 is formed with access slots 232 and threads 234 formed at the inner-peripheral surface of an opening 235. As shown in FIG. 53, head 230 is formed by two cutting tools 236 each extending radially inwardly and adjacent to each other. The surfaces 237 on the tools 236 cut threads into the inner-peripheral surface of the bore 235.

A pin abuts the vertically lower surface of the cutting tools 237. As shown in FIG. 54, the pin also abuts the lower surface in yet another embodiment of forming threads within a head 240. In forming the head 240, a plurality of cutting tools 242 move radially inwardly at different axial positions, and other cutting tools 244 move radially inwardly in an opposed direction. The cutting tools do not extend circumferentially entirely through the head 240, but only through one wall. The cutting tools 242 and 244 form threads on the opposed surfaces of the bore within the head 240. Thus, the head 240 is formed .with threads at each axial location, except for the circumferential location where the cutting tools 242 or 244 cut through the head 240. As shown, the pin 246 has an uppermost portion 248 which is in contact with the lowermost tool 244.

Figure 57:
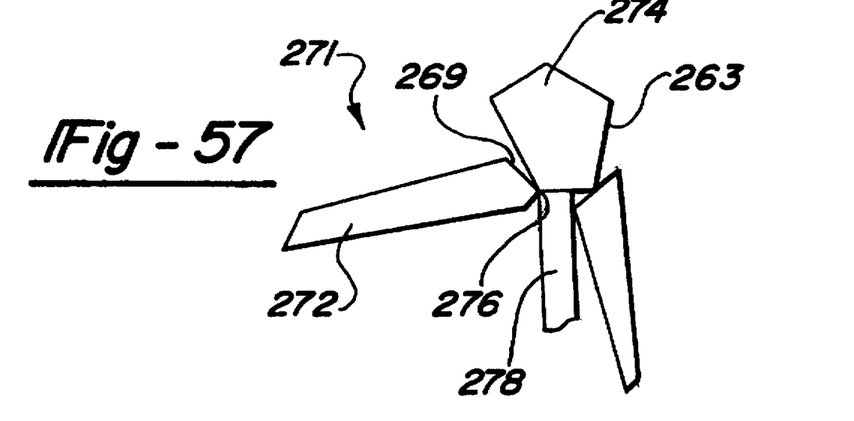
FIG. 57 shows another embodiment.

As shown in FIG. 57, due to the increased strength provided by the contact at surfaces 263 and 269, outer legs 270 may be eliminated. Single legs 272 are shown in the embodiment 271 connected to head 274 by a hinge 276. A strap or stud 278 connects the head 275 to an outer portion of the retainer 270 that may be similar to portion 264.

Figure 55:
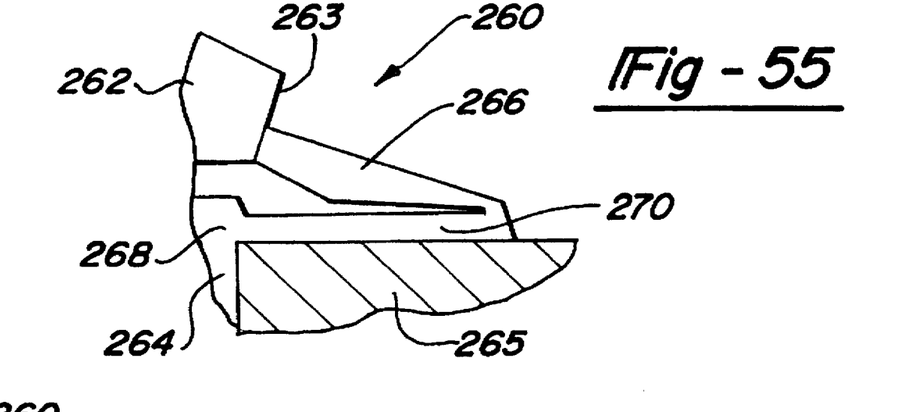
FIG. 55 shows another embodiment of the present invention.
Figure 56:
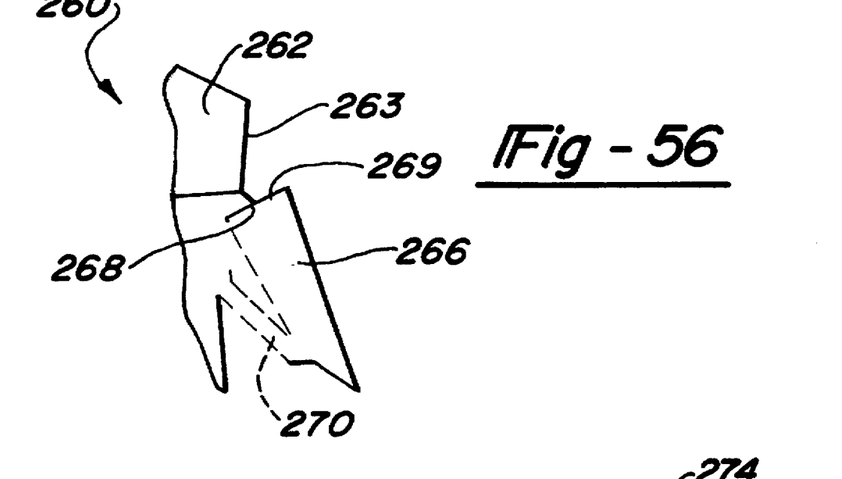
FIG. 56 shows the embodiment of FIG. 55.

In the embodiments of FIGS. 55–57, the legs are formed to extend radially outwardly from the head in a relaxed position similar to the embodiments shown in U.S. Pat. No. 5,244,324. With these embodiments, the load is also transmitted to the wall at a location spaced from the aperture.

FIGS. 55–57 show other embodiments more similar to the type of retainer shown in U.S. Pat. No. 5,244,324. In FIG. 55, a retainer 260 has an internally threaded head 262 with an angled side 263. An outer portion 264 extends through wall 265. An inner leg 266 is connected at hinge 268 to head 262. An angled surface 269 abuts angled surface 263 when the retainer is tightened against wall 265. Preferably, there are two legs. This provides additional strength to the legs and holds them against wall 265. Moreover, more flexibility and design control is provided to select the point where locking occurs. As shown, an outer leg 270 is connected to inner 266 and contacts wall 265 at point 272. The retainer 260 is shown in FIG. 56.

Although several preferred embodiments of this invention have been disclosed, a worker of ordinary skill in the art would recognize that other modifications would come within the scope of this invention. For that reason the following claims should be studied to determine the true scope and content of this invention.

I claim:

1. A retainer for receiving a threaded fastener comprising:
   a retainer body formed having a generally cylindrical outer periphery centered about a central axis of said retainer, said outer periphery being generally cylindrical and constant;
   a head having a threaded inner bore for receiving a threaded fastener, said head defining an inner end of said retainer body;
   an inner subsection hingedly attached to said head;
   an outer subsection hingedly attached to said inner subsection;
   an outer portion hingedly attached to said outer subsection, said cylindrical body having an outer periphery that is generally cylindrical except for said hinge locations, said hinges being formed by having radially thinner portions on the outer periphery of said body at said hinge locations; and
   said body being designed such that said outer portion extends axially for sufficient distance such that it will extend entirely through the thickness of a wall that is to receive said retainer, said inner and outer subsections, said head and said outer portion being designed such that when a threaded fastener is threaded into said retainer and into said head, said head is drawn axially towards said outer portions, said outer subsection rotating about said hinged connection to said outer portion, and into contact with a wall which receives said retainer at a radially outer end, said outer subsection extending away from said wall radially inwardly of said radially outer end and extending to said outer portion, said inner subsection rotating about the hinged connection to said head, and said inner and outer subsections being in abutting contact adjacent to the hinge between said inner and outer subsections when said retainer is fully received within a wall such that a truss-like configuration is defined.

2. A retainer as recited in claim 1, wherein there are three sets of said inner and outer subsections.

3. A retainer as recited in claim 1, wherein there is structure to prevent relative rotation between said members of said body.

4. A retainer as recited in claim 3, wherein said head is formed with cutting splines to assist in cutting an aperture through said wall, and said inner subsections are formed within a cut-away section that will be received in abutting contact with said cutting splines when said retainer is received in its fully assembled position.

5. A retainer as recited in claim 4, wherein said outer subsection is formed with a cut-away portion that interlocks with a mating thicker portion on said outer portion when said retainer is in said assembled position, and said outer portion is formed with a cut-away portion that receives a thicker portion of said outer subsection circumferentially adjacent to said cut-away portion to provide abutting contact preventing relative rotation between said outer portion and said outer subsections.

6. A retainer as recited in claim 3, wherein said outer subsection is formed with a cut-away portion that interlocks with a mating thicker portion on said outer portion when said retainer is in said assembled position, and said outer portion is formed with a cut-away portion that receives a thicker portion of said outer subsection circumferentially adjacent to said cut-away portion to provide abutting contact preventing relative rotation between said outer portion and said outer subsections.

7. A retainer as recited in claim 3, wherein portions of said inner and outer subsection which face radially inwardly in said originally formed body include interlocking structure to prevent relative rotation between said inner and outer subsections when said retainer is in its fully assembled position.

8. A retainer as recited in claim 7, wherein said interlocking structure includes a tongue and groove connection between said inner and outer subsections that is engaged when said retainer is in its fully assembled position.

9. A retainer as recited in claim 7, wherein said interlocking structure includes said inner and outer subsections including correspondingly curved surfaces that mate with each other when said inner and outer subsections are engaged and said retainer is in said fully assembled position.

10. A retainer as recited in claim 7, wherein said inner and outer subsections are formed with angled surfaces that are received within each other when said inner and outer subsections are engaged and said retainer is in said fully assembled position.

11. A wall which receives a threaded fastener comprising:
a wall having an aperture;
a retainer received in said aperture, said retainer including a body extending along a central axis with a head at an axially inner portion, said head having an inner threaded bore to receive a threaded fastener;
at least two sets of inner and outer subsections, said inner subsections being hingedly attached to said head, said outer subsections being hingedly attached to said inner subsections, and being hingedly attached to an outer portion; and
said retainer being designed such that said inner and outer subsections being folded about said hinges to create a truss-like configuration, and said outer subsection contacting said wall at a location spaced radially outwardly from said central axis and at a radially outer end of said outer subsection, said outer subsection extending axially away from said contact point to be connected to said outer portion at a location spaced axially inwardly from the inner face of said wall, and said inner and outer subsections being in contact at a face that faces radially inwardly when said retainer body is initially formed, said abutting contact providing a resilient force holding said contact points against the wall when said retainer is received in said wall.

12. A wall as recited in claim 11, wherein there are three sets of said subsections.

13. A wall as recited in claim 11, wherein there is interlocking structure preventing relative rotation between at least some portions of said retainer when said retainer is fully assembled in said wall.

14. A wall as recited in claim 13, wherein said head is formed with cutting splines at said outer peripheral surface, said inner subsections being formed with a cut-away portion that rotates upwardly to be circumferentially adjacent to said cutting splines such that there is contact between said inner subsection and said cutting spline preventing relative rotation between said head and said inner subsections.

15. A wall as recited in claim 14, wherein there is an interlocking tongue and groove connection between said inner and outer subsections preventing relative rotation between said inner and outer subsections.

16. A wall as recited in claim 15, wherein said inner subsection is formed with a radially thinner cut-away portion at its outer peripheral surface, said cut-away portion being received on a portion of said outer portion adjacent to said hinge between said outer portion and said outer subsection, and said outer portion being formed with a cut-away portion that is circumferentially adjacent to said portion of said outer portion which receives said cut-away from said outer subsection, a portion of said outer subsection being received within said cut-away on said outer portion, and the abutting contact between said outer portion and said outer subsection adjacent to said cut-aways preventing relative rotation between said outer subsection and said outer portion.

17. A retainer as recited in claim 13, wherein portions of said inner and outer subsection which face radially inwardly in said originally formed body include interlocking structure to prevent relative rotation between said inner and outer subsections when said retainer is in its fully assembled position.

18. A retainer as recited in claim 17, wherein said interlocking structure includes a tongue and groove connection between said inner and outer subsections preventing relative rotation between said inner and outer subsections.

19. A retainer as recited in claim 17, wherein said interlocking structure includes said inner and outer subsections including correspondingly curved surfaces that mate with each other when said inner and outer subsections are engaged and said retainer is in said fully assembled position.

20. A retainer as recited in claim 17, wherein said inner and outer subsections are formed with angled surfaces that are received within each other when said inner and outer subsections are engaged and said retainer is in said fully assembled position.

21. A method of securing a retainer within a wall comprising the steps of:
(1) providing a plastic retainer body having a head at an inner end, an inner subsection hingedly attached to said head, an outer subsection hingedly attached to said inner subsection, and an outer portion hingedly attached to said outer subsection;

(2) inserting a retainer within a wall, such that said outer portion extends through an aperture of said wall;

(3) tightening a threaded member within said retainer to draw said head towards said outer portion, said retainer being designed such that as said head is drawn toward said outer subsection, said inner subsection begins to rotate relative to said hinge at said head, said outer subsection begins to rotate relative to said outer portion, and said inner and outer subsections also rotate relative to each other about said hinge, and towards each other;

(4) continuing to tightening said threaded member and draw said head towards said outer portion until a radially outermost end of said outer subsection abuts an inner surface of said wall, and radially inner portions of said outer subsection extending away from said wall and to said outer portion and being spaced from said wall;

(5) continuing to tighten a threaded portion within said retainer and further draw said head towards said outer portion until said inner subsection abuts said outer subsection adjacent said outermost portion of said outer subsection.

22. A retainer as recited in claim 1, wherein there are a plurality of sets of said subsections spaced circumferentially about a central axis of said retainer such that the points of contact between said retainer and said wall are spaced circumferentially, and radially outwardly from said retainer.

23. A method as recited in claim 2, wherein there are at least three sets of subsections.

24. A method as recited in claim 3, wherein there are three sets of subsections.

25. A method as recited in claim 1, wherein the retainer is provided with locking structure to prevent relative rotation between said head and said inner subsection about a central axis of said retainer, and is further provided with locking structure to prevent relative rotation between said outer subsection and said outer portion about a central axis of said retainer, and the method further includes the steps of engaging said locking structure as said retainer moves between steps 3 and 5.

* * * * *